US006848707B2

(12) United States Patent
Bauer et al.

(10) Patent No.: US 6,848,707 B2
(45) Date of Patent: *Feb. 1, 2005

(54) AUTOMOTIVE TRIM PIECE AND METHOD TO FORM AN AIR BAG DEPLOYMENT OPENING

(75) Inventors: David J. Bauer, deceased, late of West Bloomfield, MI (US); by John W. Bauer, legal representative, Allen Park, MI (US)

(73) Assignee: TIP Engineering Group, Inc., Farmington Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/389,351

(22) Filed: Mar. 14, 2003

(65) Prior Publication Data

US 2003/0155749 A1 Aug. 21, 2003

Related U.S. Application Data

(63) Continuation of application No. 09/139,612, filed on Aug. 25, 1998, now abandoned, which is a division of application No. 08/851,413, filed on May 5, 1997, now Pat. No. 5,797,619, which is a continuation of application No. 08/511,327, filed on Aug. 4, 1995, now abandoned, which is a division of application No. 08/391,366, filed on Feb. 21, 1995, now abandoned, which is a division of application No. 07/934,886, filed on Aug. 24, 1992, now Pat. No. 5,217,244, which is a continuation of application No. 07/471,922, filed on Jan. 23, 1990, now abandoned, which is a continuation-in-part of application No. 07/380,156, filed on Jul. 14, 1989, now abandoned, which is a continuation-in-part of application No. 07/303,132, filed on Jan. 30, 1989, now Pat. No. 5,080,393.

(51) Int. Cl.⁷ .......................... B60R 21/16; B60R 21/20
(52) U.S. Cl. .................................. 280/728.3; 280/732
(58) Field of Search .............................. 280/728.3, 732

(56) References Cited

U.S. PATENT DOCUMENTS 3,632,136 A   1/1972   Foltz .......................... 280/150
3,640,546 A   2/1972   Brawn (List continued on next page.)

FOREIGN PATENT DOCUMENTS

| JP | SHO 58-38131 | 3/1983 |
| JP | SHO 62-127840 | 8/1987 |
| JP | SHO 63-22262 | 2/1988 |
| JP | SHO 63-101255 | 7/1988 |
| JP | 1-81154 | 5/1989 |
| JP | HEI 1-81157 | 5/1989 |
| JP | HEI 1-122753 | 5/1989 |
| JP | 1-122754 | 5/1989 |
| JP | 2-99324 | 4/1990 |

*Primary Examiner*—Eric Culbreth
(74) *Attorney, Agent, or Firm*—John R. Benefiel

(57) ABSTRACT

An arrangement for forming an opening in an auto interior trim panel or piece normally having no visible indication of the opening just prior to inflation of an inflatable air bag, allowing deployment of the air bag into the passenger compartment of vehicle, the arrangement including a linear element positioned below the skin of the trim panel or wheel cover in a pattern corresponding to the opening. In a first embodiment a heat generating element is employed as the linear element which when activated degrades the covering skin layer of the trim piece in pattern shape. In a second embodiment detonating cord enclosed in a metal tube is employed with a series of holes directing the energy of detonation to sever the panel skin material. In a third embodiment a split sleeve having explosive coating on the inside is used to create a flame front severing the panel kin in the appropriate pattern. The skin may be mechanically preweakened prior to assembly by a precision cutting operation performed on the inside surface, in a pattern matching with the pattern of the linear element, aiding the process of forming the opening in the trim piece at the instant of deployment.

4 Claims, 3 Drawing Sheets

U.S. PATENT DOCUMENTS

| | | |
|---|---|---|
| 3,756,617 A | 9/1973 | Brown |
| 4,120,516 A | 10/1978 | Takamatsu et al. |
| 4,327,937 A | 5/1982 | Scholz et al. ............... 280/732 |
| 4,334,699 A | 6/1982 | Patzelt et al. ............... 280/731 |
| 4,400,010 A | 8/1983 | Stutz et al. ................. 280/732 |
| 4,991,870 A * | 2/1991 | Beusterien et al. ......... 280/732 |
| 5,080,393 A | 1/1992 | Dixon, Jr. et al. .......... 280/732 |
| 5,797,619 A * | 8/1998 | Bauer et al. ............. 280/728.3 |

* cited by examiner

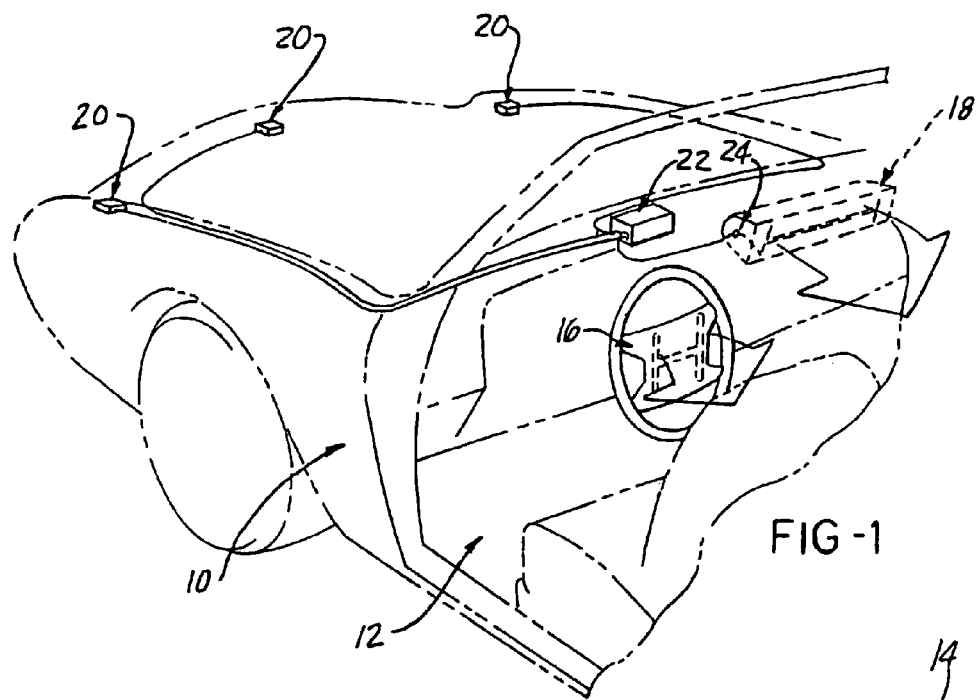
FIG-1
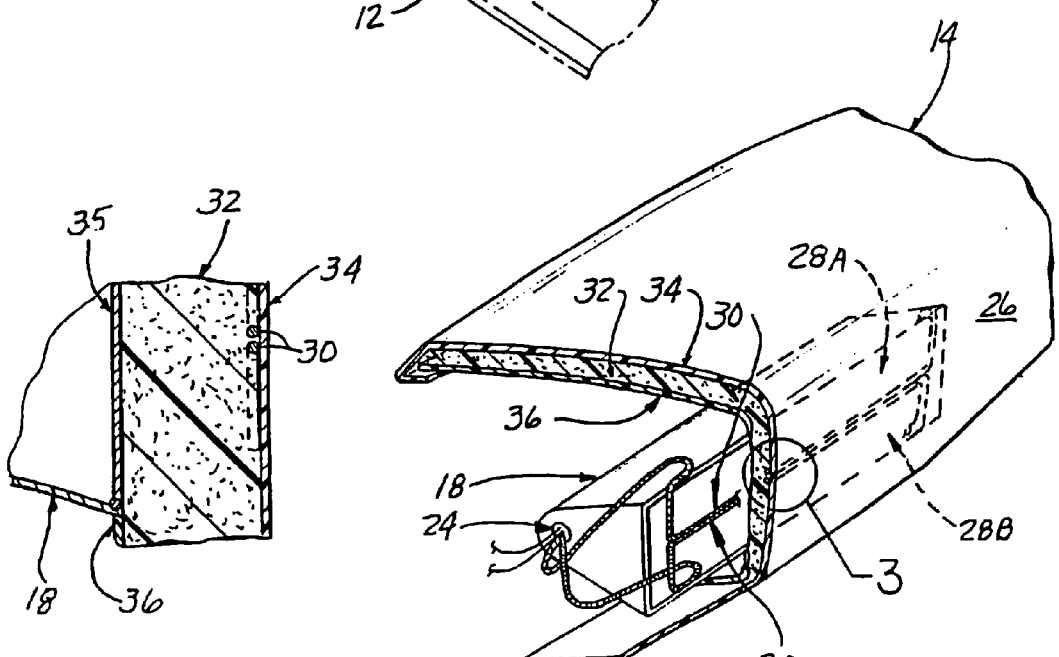
FIG-3
FIG-2

AUTOMOTIVE TRIM PIECE AND METHOD TO FORM AN AIR BAG DEPLOYMENT OPENING

CROSS REFERENCE TO RELATED APPLICATIONS

This application is a continuation of Ser. No. 09/139,612 filed on Aug. 25, 1998, now abandoned, which is a division of U.S. Ser. No. 08/851,413 filed on May 5, 1997, now U.S. Pat. No. 5,797,619, which is a continuation of U.S. Ser. No. 08/511,327 filed on Aug. 4, 1995, now abandoned, which is a division of U.S. Ser. No. 08/391,336 filed on Feb. 21, 1995, now abandoned, which is a division of U.S. Ser. No. 07/934,886 filed on Aug. 24, 1992, now U.S. Pat. No. 5,217,244, which is a continuation of U.S. Ser. No. 07/471,922 filed on Jan. 23, 1990, now abandoned, which is a continuation-in-part of U.S. Ser. No. 07/380,156 filed on Jul. 14, 1989, now abandoned, which is a continuation-in-part of U.S. Ser. No. 07/303,132 filed on Jan. 30, 1989, now U.S. Pat. No. 5,080,393.

BACKGROUND OF THE INVENTION

This invention concerns auto safety systems and more particularly inflatable cushion devices commonly referred to as "air bags". In such devices, a fabric cushion (the air bag) is stored in a folded condition within a receptacle defining a storage space within the vehicle passenger compartment. Upon activation of a crash sensor detecting an imminent high velocity impact, the air bag is inflated with a chemically generated gas and deployed in a manner and position calculated to absorb the impact of the driver or passenger thrown forward as the vehicle is sharply decelerated at impact.

The folded air bag, gas generator, and other components of the system may be stored within a receptacle mounted in the steering wheel or behind the instrument panel forward of the passenger seat, covered by one or more doors which are opened by pressure generated by the inflating air bag.

The receptacle must be stored in a manner which is tamper proof, yet allowing instantaneous deployment of the air bag upon system activation. Further, the covering must resist normal pressure exerted thereon as by incidental contact with the vehicle occupants.

Prior art systems have typically involved exteriorly visible patterns on the surface instrument panel or steering wheel covers delineating the openings therein through which the air bag will be deployed.

The presence of the visible pattern reduces the aesthetic appeal of the interior trim surfaces and is disturbing to many persons as it makes the presence and possible pending deployment of the air bag obvious. This visible pattern also makes the systems more vulnerable to tampering because of its evident location.

The usual approach in designing a closure is to provide a hinged door latched by a detent mechanism or snap fitted portions forced apart by the pressure of the inflating air bag. See U.S. Pat. No. 4,327,937 issued on May 4, 1982 on a "Downwardly Foldable Covering For a Gas Cushion" for an example of such a covering.

Another common approach is to provide an exteriorly visible line of weakening in a covering skin which is ruptured by the air bag upon deployment. See for examples of such a design U.S. Pat. No. 4,400,010 issued on Aug. 23, 1983 for "Air Bags in Motor Vehicles", and U.S. Pat. No. 4,334,699 issued on Jun. 15, 1982 for "Cap Like Cover for an Air Bag Installation".

U.S. Pat. No. 3,640,546 issued on Feb. 8, 1972 for a "Safety Apparatus" discloses a preweakened covering skin over closure doors but the seam skin is unsupported along the seam, and thus the seam would be tactilely perceptible and also, over time, would also become visible due to the absence of any support underneath.

Another approach is described in U.S. Pat. No. 3,632,136 issued on Jan. 4, 1974 for a "Safety Apparatus", in which a powerful linear shaped explosive charge is used to sever a door lock and reinforcing panel to release a locked door just prior to deployment of the air bag to enable the door to be pushed open by the air bag.

In all of the above designs, the outline of the closure is suggested, and some also result in the showering of debris into the passenger compartment when the system is activated.

Most designs also use separately manufactured and installed covering doors, which increased the cost of manufacture of the air bag installation.

In copending U.S. patent application Ser. No. 07/303,132 filed on Jan. 30, 1989, now U.S. Pat. No. 5,080,393, there is disclosed an invisible closure utilizing a length of detonation cord to create an air bag deployment opening in an interior auto body panel to avoid any suggestion that an air bag is installed therein.

SUMMARY OF THE INVENTION

The present invention provides an invisible air bag installation by the preweakening of the covering layer or skin of a seamless expanse of a trim panel, by cutting a groove into the inside of covering layer in a pattern shaped so as to form a deployment opening immediately above an air bag receptacle mounted behind the trim panel.

The underlying substrate includes a separate door panel fit into an opening in the substrate, so that by preweakening the covering skin, the remaining portions of the trim panel adjacent the pattern are easily able to be pushed aside by inner door panels opened by the expanding air bag to enable deployment through the opening. A degrading of the skin is also carried out by the controlled application of energy.

This preweakening is accomplished by cutting a groove into the inside surface of the skin to a carefully controlled depth to provide for a consistent preweakening of the skin in a matching pattern to augment the effect of activation of the linear element.

DESCRIPTION OF THE DRAWINGS

FIG. 1 is a perspective fragmentary view in phantom of the forward position of an automobile illustrating air bag covering installations according to the present invention.

FIG. 2 is a transverse sectional view of a trim panel having an arrangement of linear thermal generators mounted embedded therein to enable an air bag deployment opening to be formed therein according to the present invention.

FIG. 3 is an enlarged fragmentary perspective view of the arrangement of a trim panel and thermal generator elements according to the present invention.

DETAILED DESCRIPTION

Figure 4:
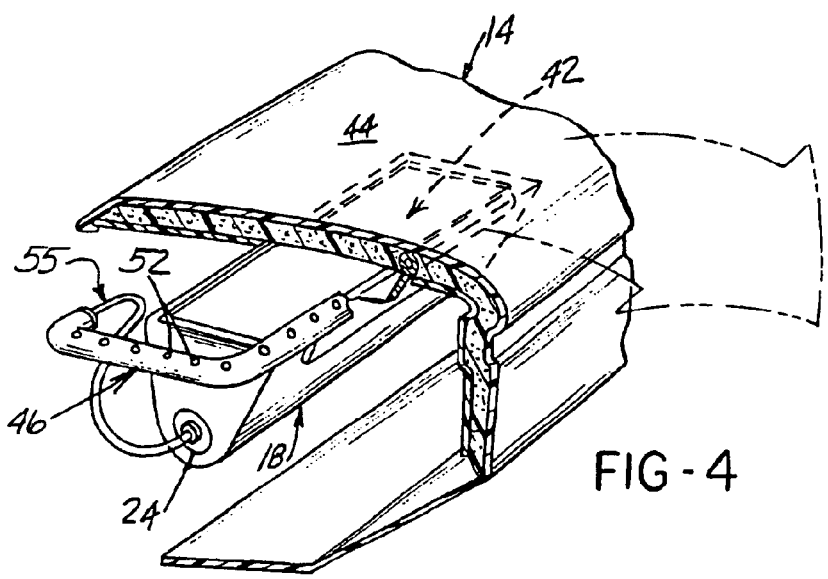
FIG. 4 is a fragmentary perspective view of an instrument panel having an alternate air bag deployment opening forming arrangement according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, major components of an air bag safety system are depicted installed in an automobile. The automobile body 10 has a passenger compartment 12, with various trim panels and pieces finishing the interior thereof.

The air bag system may include a passenger side air bag stored behind an instrument panel 14 and a driver side air bag stored beneath a steering wheel cover 16, the instrument panel 14 and steering wheel cover 16 each comprising such an interior trim panel or piece arrayed about the passenger compartment.

Each air bag installation includes a receptacle 18 containing a folded air bag, which is deployed into the passenger compartment by being inflated with a gas in the manner well known to those skilled in the art. A plurality of crash sensors 20 are arranged about the front of the vehicle which upon the occurrence of a severe collision, generate electrical signals received by a control unit 22, which in turn activates the gas generator contained within the receptacle 18.

Since such air bag systems are well known in the art, and the present invention is not concerned with the details thereof a description of these details is not here set out.

Suffice it to say that the gas generators typically are activated by an ignitor assembly 24 which upon receiving an electrical signal, ignite a chemical charge to produce a high temperature reaction which in turn initiates the chemical reaction producing a large volume of nitrogen gas for inflation of the air bag.

As described above, the air bag must be stored ready for deployment until such collision occurs.

A deployment opening is formed by the controlled application of concentrated energy onto a smooth, uninterrupted expanse of a trim panel, wheel cover, or other piece behind which is mounted an air bag, at the instant of deployment of the air bag.

Such opening is almost instantly formed by the very rapid application to the covering skin therein of energy sufficient to form a line of separation in a pattern shaped to form three sides of a single covering outer door, or of a pair of covering outer doors, with the other side or sides bent by the force of the inflating air bag to act as a hinge to open the door so formed.

The trim panel or piece is constructed so that the remaining portions thereof in the region above the air bag receptacle are sufficiently weakened to be easily severed by receptacle doors pushed open by the air bag itself.

A first embodiment of the energy application arrangement is illustrated in a so-called midmount installation, shown in FIGS. 1–3. A pair of such covering doors are formed at the instant of system activation, the doors 28A, 28B from a smooth expanse 26 of the instrument panel 14, and each door 28A, 28B hinged along opposite sides in moving to form a deployment opening.

In this first embodiment lengths of linear thermal generating elements 30 are embedded in the instrument panel 14 in the described double door pattern over the air bag receptacle 18. A shown in FIG. 3, the elements 30 are located just below the covering outer layer here comprised of a vinyl skin 34. The trim panel such as the instrument panel 14 is constructed to have sufficient structural integrity to enable assembly and to resist normal contact pressures. Such construction is typically provided by a stiff under layer 36 of metal or rigid plastic overlain by a layer of soft foam 32 and covered by the skin 34.

According to the concept of the present invention, the under layer 36 has an opening formed therein shaped to allow the air bag receptacle 18 to be received thereinto, leaving only the layer of foam 32 and the skin 34 above a hinged inner door or doors 35 covering the receptacle 18. Such inner doors 35 may alternatively be incorporated in the instrument panel 14. The receptacle 18 is mounted as by bracketing (not shown) to be supported beneath the instrument panel 14 in the position shown in FIG. 3.

The thermal generating elements 30 may comprise a material consisting of two diverse metallic elements in intimate contact with each other. When these elements are subjected to an initiating temperature, a very rapid alloying reaction occurs, in which a great amount of heat is released. Such material in thin wire or ribbon form, comprises an outer core of a palladium alloy and an inner core of aluminum alloy is commercially available under the trademark "PYROFUZE"™ from Pyrofuze Corp. Of Mount Vernon, N.Y.

Preferably, several of these elements each of small diameter, i.e., 0.004 or 0.005 inches thick, are twisted together to generate sufficient heat while maintaining the very high speed reaction required.

This reaction is not explosive and results in a heat degradation of the vinyl skin 34 in the pattern of the element 30 sufficient to allow the inner doors 35 and deploying air bag to push out and separate the adjoining sections of the foam layer 32 thereof.

The elements 30 may be directly connected to the air bag ignitor assembly 24, thereby insuring coordinated activation simultaneously with the air bag deployment.

Figure 5:
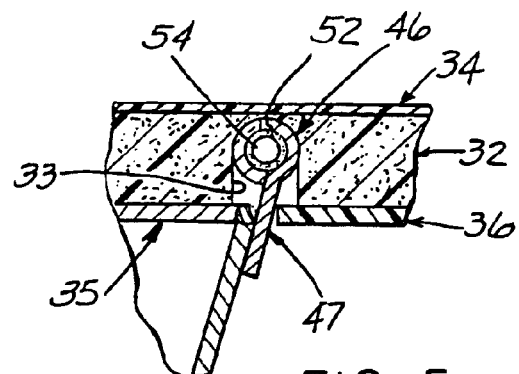
FIG. 5 is a transverse sectional view of the instrument panel and opening forming arrangement shown in FIG. 4.

An alternate embodiment is shown in FIGS. 4 and 5, illustrated applied to a "topmount" application in which a single outer door 42 is formed in a smooth expanse 44 of a horizontal surface of the instrument panel 14 to allow deployment of the air bag stored in the receptacle 18 directly beneath the door 42.

In this instance, a length of tube 46 of the desired configuration is positioned within a slot 33 let into the foam core 32, firmly mounted by being secured to one side of the air bag receptacle 18 with tabs 47.

The tubing 46 has a series of holes 52 directed outwardly towards the skin 34. A length of detonating cord 54 is disposed within the tube 46 and detonated by transmission of shock via a connector tube 55 with the ignitor assembly 24 of the air bag system itself so as to be simultaneously discharged. The detonating cord 54 may be commercially available as low power "Primaline"™.

As a result, a series of gas pressure jets are directed to perforate or otherwise degrade the skin 34 in the pattern outlining the door 42 so as to allow easy separation of the door 42 upon contact with the expanding air bag. The confinement of the detonating cord 54 within the tube 46 attenuates the intensity of the blast and eliminates the directing of any debris into the passenger compartment.

Figure 6:
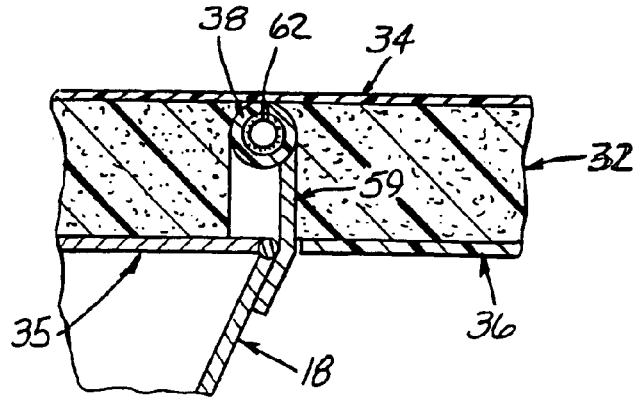
FIG. 6 is a transverse sectional view through an instrument panel and yet another embodiment of an opening forming arrangement according to the present invention.
Figure 7:
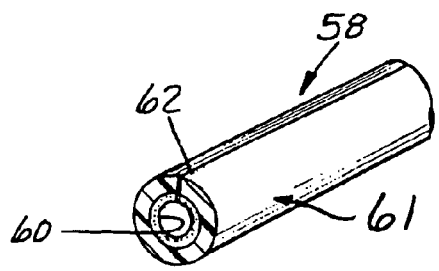
FIG. 7 is a perspective view of the shock tube element incorporated in the opening forming arrangement shown in FIG. 6.

Yet another embodiment is shown in FIGS. 6 and 7, in which a split sleeve type linear element 58 is embedded in the foam core 32 lying beneath the skin 34, arranged in a pattern corresponding to the door to be formed. The element 58 is secured to the receptacle 18 with formed tabs 59. A thin layer of explosive 60 coats the inside of a plastic tube 61. When detonated, a flame front propagates extremely rapidly along the slit 62, which is forced open by the pressure generated by detonation.

This flame front very effectively slices through the skin 34 to form the door through the unmarked expanse of instrument panel 14.

Such material is available under the trademark "NONEL" from the Ensign-Bickford Company of Simsbury, Conn.

The invention provides a strong tamper proof covering of the air bag receptacle which is invisible to the vehicle occupants, yet instantly provides an opening for proper deployment of the air bag upon activation of the system. By integrating the covering doors into the trim piece itself, the overall cost of manufacture is reduced and the system is simplified.

The arrangement according to the present invention while illustrated for passenger side air bag installations may also be employed for driver side air bags, by similar design of the steering wheel cover 16.

Figure 8:
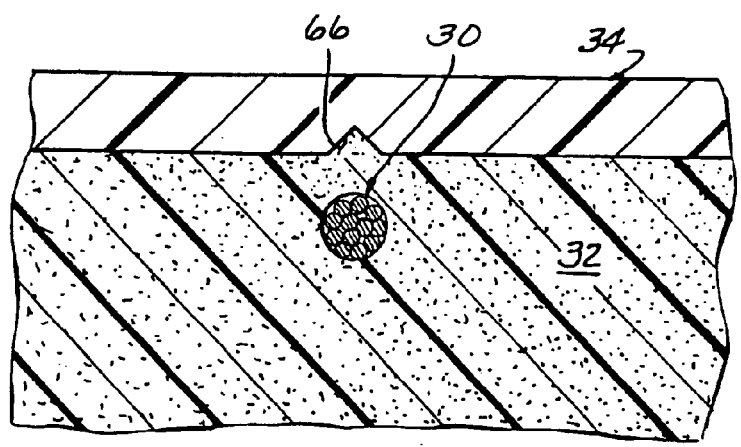
FIG. 8 is a fragmentary enlarged sectional view of the outer region of a trim panel in which a preweakening of the skin is achieved with a groove cut into the inside face.

The above described arrangements may also be combined with a mechanical preweakening of the outer layer covering skin 34, as depicted in FIG. 8.

This preweakening must be able to be accomplished to a uniformly consistent level in production.

According to this aspect of the concept of the present invention, this preweakening is achieved by cutting into the skin 34 along the inside surface thereof to form a groove 66 of a consistently controlled depth, and extending in the pattern of the opening to be formed. The groove 66 thus lies above the linear element.

Figure 9:
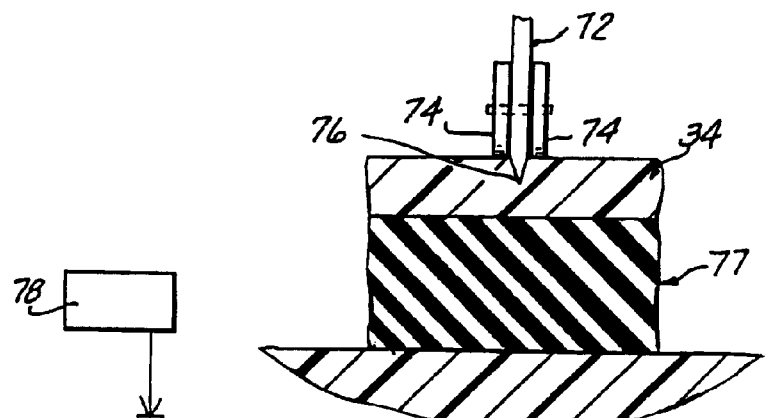
FIG. 9 is a sectional fragmentary view of a portion of skin having the groove being cut therein.

As noted, it is critical that the partial cutting of the inside of the skin 34 be consistently held to the designed for depth. FIG. 9 illustrates how this can be effectively done. A suitable cutting blade 72 has mounted to it guide elements 74 such as rollers adapted to rest on the surface of the skin 34 as the blade 72 traverses the skin 34. The distance below the surface of the skin 34 that the cutting edge 76 protrudes corresponds to the depth of cut, and should be set accordingly.

According to one aspect of this method, substantial compression of the skin material below the cutting edge 76 should be avoided in order to achieve a consistent depth. This requirement may be met by placing the skin 34 on a bed of a more easily compressed material than that of the skin, i.e., for example a layer of neoprene rubber 77 may be placed beneath a vinyl skin. This allows a slight deflection of the vinyl skin away from the cutting edge 76 to relieve excessive compression leading to erratic and inconsistent results.

Figure 10:
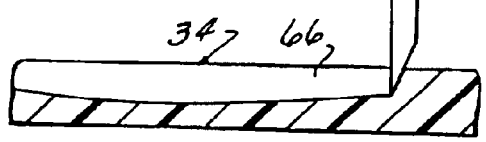
FIG. 10 is a sectional view of a portion of skin being formed with a preweakening cut, with a diagrammatic representation of a cutting device.

The partial cutting of the inside of the skin 34 can also be varied across the width of the disclosure, from a maximum depth at the center to a reduced depth at either side as shown in FIG. 10. This can be done by varying the depth of the cut 66, as by a cam control 78 or other arrangement. This configuration can insure beginning of the tear at the center and propagation to either side.

Thus, the activation of the element 30 can partially further degrade the skin 34 (and foam 32) in the pattern, with the force of the deploying air bag then mechanically severing the skin 34 along the preweakening groove 66. The reliably severed, combined effect can provide an exteriorly invisible seam forming the air bag deployment opening.

What is claimed is:

1. An automotive interior trim piece for covering a stored air bag device located at a particular location in a passenger compartment of an automotive vehicle, said trim piece comprising an instrument panel including a structural substrate member having an air bag deployment opening formed therein located over said particular location of said air bag device, one or more generally rectangular deployment door panels at least partially closing said opening and each of said one or more door panels held on one side to allow each of said one or more door panels to be swung open, and a plastic outer covering layer extending smoothly and uninterruptibly over said one or more deployment door panels at said particular location of said air bag device so as to completely conceal all sides of said one or more deployment door panels, said one or more deployment door panels thereby able to be swung open by the pressure exerted by the inflating of said air bag device to form a deployment opening in said covering layer lying over said deployment opening in said substrate member a preweakening cut extending into the inside of said covering layer, said preweakening cut extending over at least a portion of a perimeter of said one or more deployment door panels said preweakening cut substantially continuously varying in depth along at least a segment of said preweakening cut, whereby inflation of said air bag device will cause severing of said covering layer along said cut to enable deployment of said air bag device into said passenger compartment by forced opening of said one or more deployment door panels resulting in the formation of said deployment opening in said covering layer.

2. The interior trim piece according to claim 1 wherein said covering layer comprises a sheet of vinyl plastic.

3. A method of preweakening a plastic automotive trim piece covering a stored air bag device located at a particular location in a passenger compartment of an automotive vehicle including a folded stored air bag which is deployed into said passenger compartment by being inflated with a gas, a deployment panel door disposed at least partially closing an air bag deployment opening in a substrate included in said trim piece located over said stored air bag, said door panel swung open to allow deployment of said air bag through said opening in said substrate when said air bag is inflated, said door panel smoothly overlain with a covering layer extending beyond a perimeter of said door panel and over said substrate, said method comprising preweakening said covering layer by partially cutting into said covering layer from the inside of said covering layer alone a pattern extending over at least a portion of a perimeter of said door panel, the depth of said cutting substantially continuously varied over at least a segment of said cutting, said cutting carried out while avoiding substantial compression of said covering layer to thereby enable a consistently controlled cutting depth, said cutting extending along a pattern extending over at least a portion of said perimeter of said door panel, whereby inflation of said air bag will cause said inflating air bag to swing said door panel out to sever said covering layer along said cutting pattern to enable deployment of said air bag into said passenger compartment by formation of a deployment opening in said covering layer.

4. A method of preweakening a plastic automotive trim piece covering a stored air bag device located at a particular location in a passenger compartment of an automotive vehicle including a folded stored air bag which is deployed into said passenger compartment by being inflated with a gas through a deployment opening in said trim piece and allow deployment of said air bag through said opening, said trim piece formed with a structural substrate member having a generally rectangular deployment opening formed therein, and a generally rectangular deployment door panel disposed to at least partially close said deployment opening and held on one side to enable said door panel to be swung open, and with a covering layer extending over said substrate member smoothly and uninterruptibly across all sides of said deployment door panel to conceal the same, said method comprising preweakening said covering layer by partially cutting into said trim piece covering layer from the inside of said covering layer the depth of the cutting substantially continuously varied alone at least a segment of said cutting, said cutting carried out while avoiding substantial compression of said covering layer, said cutting segment extending over a portion of a perimeter of said deployment door panel overlying said stored air bag devices, including along a side of said deployment door panel opposite said held side, whereby inflation of said air bag will cause said inflating air bag to swing open said deployment door panel and cause said deployment door panel to sever said covering layer along said cutting extending over said portion of said perimeter of said door panel to enable deployment of said air bag into said passenger compartment by formation of a deployment opening in said covering layer over said deployment door panel.

* * * * *

UNITED STATES PATENT AND TRADEMARK OFFICE
CERTIFICATE OF CORRECTION

PATENT NO.       : 6,848,707 B2
APPLICATION NO.  : 10/389351
DATED            : February 1, 2005
INVENTOR(S)      : David J. Bauer et al.

It is certified that error appears in the above-identified patent and that said Letters Patent is hereby corrected as shown below:

On the title page item (57), Abstract, line 15, cancel the text beginning with "severing the panel kin" and replace with --severing the panel skin--.

Column 6, line 30, in claim 1, cancel the text beginning with "said substrate member a" and replace with --said substrate member, a--.

Column 6, line 57, in claim 2, cancel the text beginning with "of said covering layer alone" and replace with --of said covering layer along--.

Column 8, lines 2 and 3, claim 4, cancel the text beginning with "the depth of the cutting substantially continuously varied alone" and replace with --which depth of the cutting is substantially continuously varied along--.

Signed and Sealed this

Thirteenth Day of March, 2007

JON W. DUDAS
*Director of the United States Patent and Trademark Office*